United States Patent
Mishra

(10) Patent No.: US 9,582,681 B2
(45) Date of Patent: Feb. 28, 2017

(54) METHOD AND APPARATUS FOR PRIVACY PROTECTION IN IMAGES

(71) Applicant: Nokia Technologies Oy, Espoo (FI)

(72) Inventor: Pranav Mishra, Bangalore (IN)

(73) Assignee: Nokia Technologies Oy, Espoo (FI)

( * ) Notice: Subject to any disclaimer, the term of this patent is extended or adjusted under 35 U.S.C. 154(b) by 103 days.

(21) Appl. No.: 14/396,209

(22) PCT Filed: Apr. 19, 2013

(86) PCT No.: PCT/FI2013/050434
§ 371 (c)(1),
(2) Date: Oct. 22, 2014

(87) PCT Pub. No.: WO2013/160539
PCT Pub. Date: Oct. 31, 2013

(65) Prior Publication Data
US 2015/0113661 A1    Apr. 23, 2015

(30) Foreign Application Priority Data

Apr. 27, 2012 (IN) .............. 1657/CHE/2012

(51) Int. Cl.
*G06F 17/30* (2006.01)
*G06F 21/62* (2013.01)
(Continued)

(52) U.S. Cl.
CPC ... *G06F 21/6245* (2013.01); *H04N 21/41407* (2013.01); *H04N 21/4223* (2013.01);
(Continued)

(58) Field of Classification Search
CPC .......... G06F 21/6245; H04N 21/41407; H04N 21/4223; H04N 21/440245; H04N 21/4788; H04W 12/02
(Continued)

(56) References Cited

U.S. PATENT DOCUMENTS 8,250,661 B2 * 8/2012 Hayashi .............. G06F 21/10
705/18
9,100,694 B1 * 8/2015 Chandel .......... H04N 21/44218
(Continued)

FOREIGN PATENT DOCUMENTS

EP          1311124 A1    5/2003
WO      03/049035 A2    6/2003
(Continued)

OTHER PUBLICATIONS

International Search Report and Written Opinion received for corresponding Patent Cooperation Treaty Application No. PCT/FI2013/050434, dated Mar. 20, 2013, 14pages.
(Continued)

*Primary Examiner* — Thu Ha Nguyen
(74) *Attorney, Agent, or Firm* — Harrington & Smith

(57) ABSTRACT

In accordance with an example embodiment of the present invention, a method is disclosed. The method includes defining a first privacy setting related to a user. Communicating the first privacy setting using a first radio communication network to a server. Storing the first privacy setting related to the user on the server. Applying the first privacy setting when analyzing an image to determine the user in the image. Determining to apply a second privacy setting related to the user. Defining the second privacy setting related to the user and communicating the second privacy setting to another device of a second user using a second radio communication network.

18 Claims, 7 Drawing Sheets

(51) Int. Cl.
    *H04N 21/414* (2011.01)
    *H04N 21/4223* (2011.01)
    *H04N 21/4402* (2011.01)
    *H04N 21/4788* (2011.01)
    *H04W 12/02* (2009.01)

(52) U.S. Cl.
    CPC . *H04N 21/440245* (2013.01); *H04N 21/4788* (2013.01); *H04W 12/02* (2013.01)

(58) Field of Classification Search
    USPC ..................... 726/26, 27; 709/206
    See application file for complete search history.

(56) References Cited

U.S. PATENT DOCUMENTS

| | | | |
|---|---|---|---|
| 2004/0208394 A1 | 10/2004 | Kurata | |
| 2007/0064943 A1* | 3/2007 | Ginter | G06F 21/10 380/233 |
| 2008/0064333 A1 | 3/2008 | Hymes | |
| 2008/0091723 A1* | 4/2008 | Zuckerberg | G06Q 30/02 |
| 2008/0134294 A1 | 6/2008 | Mattox et al. | |
| 2009/0207269 A1 | 8/2009 | Yoda | |
| 2010/0251109 A1 | 9/2010 | Jin et al. | |
| 2010/0318571 A1* | 12/2010 | Pearlman | H04L 63/104 707/784 |
| 2011/0075884 A1* | 3/2011 | Baker | G06F 17/30277 382/103 |
| 2011/0321132 A1 | 12/2011 | Slingerland et al. | |
| 2013/0073400 A1* | 3/2013 | Heath | G06Q 30/02 705/14.73 |
| 2013/0073473 A1* | 3/2013 | Heath | G06Q 30/02 705/319 |
| 2013/0117365 A1* | 5/2013 | Padmanabhan | H04W 4/206 709/204 |
| 2013/0227707 A1* | 8/2013 | Gay | H04L 63/0421 726/27 |
| 2013/0332168 A1* | 12/2013 | Kim | G10L 15/22 704/251 |
| 2013/0332857 A1* | 12/2013 | Kim | H04L 65/403 715/753 |
| 2013/0339091 A1* | 12/2013 | Humay | G06Q 30/0203 705/7.32 |
| 2014/0109231 A1* | 4/2014 | Takaoka | G06F 21/60 726/26 |
| 2014/0164934 A1* | 6/2014 | Yang | G06F 17/3089 715/738 |
| 2014/0237612 A1* | 8/2014 | Badge | G06F 21/6254 726/26 |
| 2015/0047050 A1* | 2/2015 | Das | G06F 21/10 726/26 |
| 2015/0113661 A1* | 4/2015 | Mishra | G06F 21/6245 726/26 |
| 2015/0161632 A1* | 6/2015 | Humay | G06Q 30/0203 705/7.32 |
| 2015/0319141 A1* | 11/2015 | Jang | H04L 51/18 726/26 |
| 2015/0326522 A1* | 11/2015 | Pu | G06F 21/6245 726/26 |
| 2015/0341550 A1* | 11/2015 | Lay | H04N 5/23222 348/222.1 |
| 2016/0036962 A1* | 2/2016 | Rand | H04R 1/1041 455/418 |
| 2016/0044127 A1* | 2/2016 | Filner | H04L 67/2847 709/213 |
| 2016/0162845 A1* | 6/2016 | Carroll | G06Q 10/1095 705/7.19 |

FOREIGN PATENT DOCUMENTS

| | | |
|---|---|---|
| WO | 2009/145826 A2 | 12/2009 |
| WO | 2012035149 A1 | 3/2012 |

OTHER PUBLICATIONS

Ausloos, "The 'Right to Be Forgotten'—Worth Remembering?", Computer Law & Security Review, Apr. 2012, vol. 28, Iss. 2, pp. 143-152. Posted on Dec. 9, 2011. [retrieved on Jul. 15, 2013] Retrieved from the Internet: <URL:http://ssrn.com/abstract=1970392>.

Acquisti et al., "Faces of Facebook: Privacy in the Age of Augmented Reality", Black Hat Webcast Series (online presentation), Jan. 19, 2012 [retrieved on Jul. 15, 2013] Retrieved from the Internet: <URL: http://www.balckhat.com/html/webcast/webcast-2012-facesoffacebook.html>.

Campisi et al., "Privacy Protection in Social Media Networks a Dream that can be True?" In Proceedings of the 16th International Conference on Digital Signal Processing (DSP'09). Piscataway, NJ, USA: IEEE Press, 2009, pp. 254-258.

Andrade et al., "All the Better to See You with My Dear", Facial Recognition and Privacy in Online Social Networks, IEEE Security & Privacy, May-Jun. 2013, vol. 3, No. 3, pp. 21-28.

Indian Patent Application No. 3002/CHE/2011, "Method and apparatus for providing privacy protection when Utilizing media items to search for user information", filed on Aug. 30, 2011, 41 pages.

"Facebook Scare: 2 Lakh Accounts Hacked in Bangalore", The Times of India, Retrieved on May 26, 2016, Webpage available at : http://timesofindia.indiatimes.com/tech/social-media/Facebook-scare-2-lakh-accounts-hacked-in-Bangalore/articleshow/10754012.cms?referral=PM.

"Govt Faceoff Brewing With Facebook, Others", The Times of India, Retrieved on May 26, 2016, Webpage available at : http://timesofindia.indiatimes.com/tech/tech-news/Govt-faceoff-brewing-with-Facebook-others/articleshow/10998529.cms?

"Tagmenot Privacy: No Face Recognition, Don't Tag, Blur My Face", TagMeNot.info, Retrieved on May 26, 2016, Webpage available at : http://tagmenotinfo/.

"How Google+ Transformed Picasa Web", Google Operating System, Retrieved on May 26, 2016, Webpage available at : http://googlesystem.blogspot.in/2011/07/how-google-transformed-picasa-web.html.

* cited by examiner

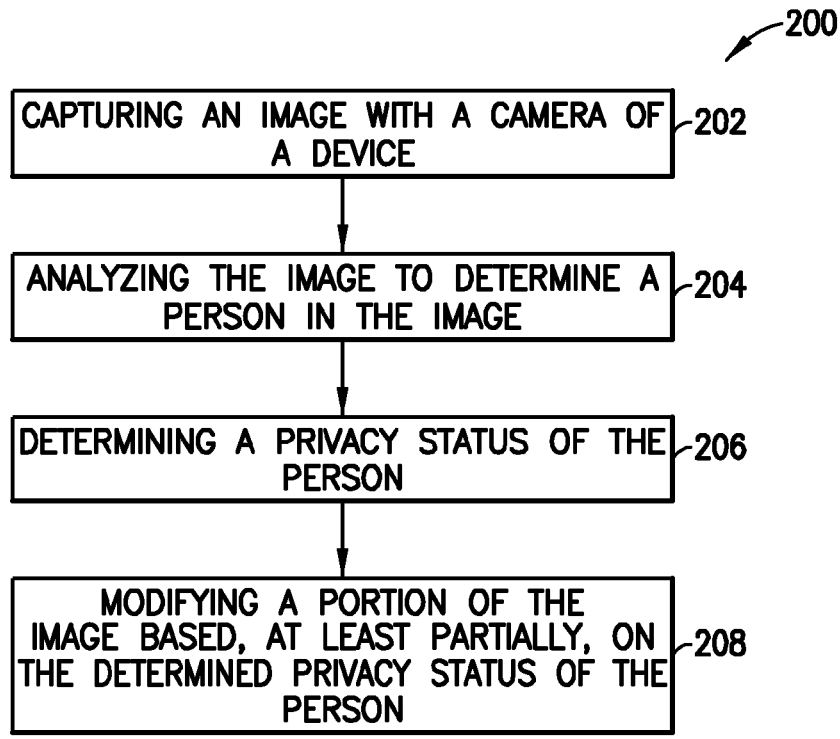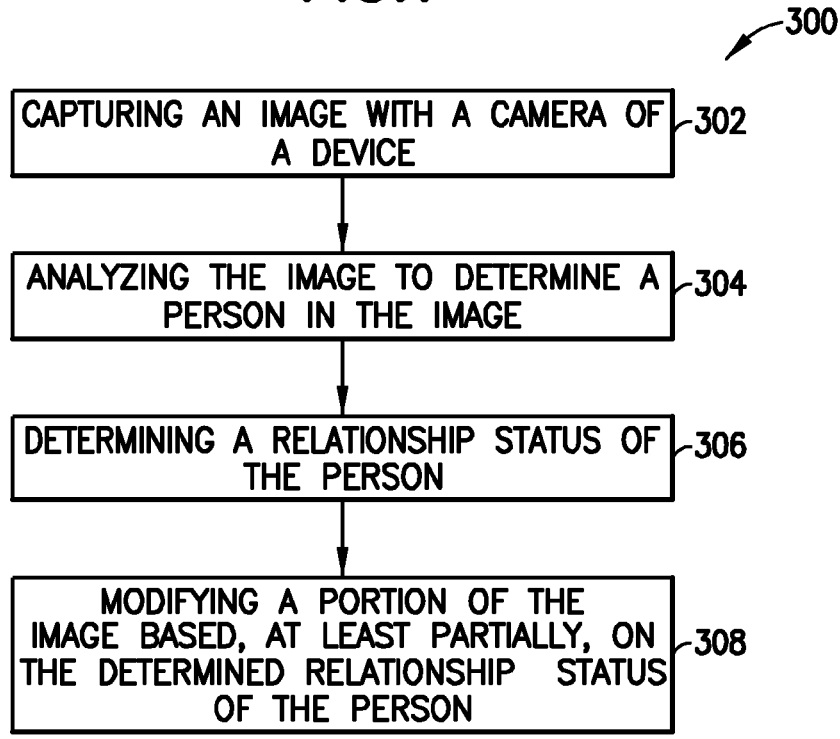

METHOD AND APPARATUS FOR PRIVACY PROTECTION IN IMAGES

RELATED APPLICATION

This application was originally filed as Patent Cooperation Treaty Application No. PCT/FI2013/050434 filed Apr. 19, 2013 which claims priority benefit to Indian Patent Application No. 1657/CHE/2012, filed Apr. 27, 2012.

TECHNICAL FIELD

The invention relates to privacy protection in images and, more particularly, to privacy protection in images available in social networks.

BACKGROUND

The popularity of social networks coupled with increased functionality from portable electronic devices provides opportunities to share and distribute information instantly. Accordingly, there is a need to provide improved devices having increased capabilities which facilitates a better user experience.

The following abbreviations that may be found in the specification and/or the drawing figures are defined as follows:

eNB EUTRAN Node B (evolved Node B)
EPC evolved packet core
E-UTRAN evolved UTRAN (LTE)
CDM code division multiplexing
LTE long term evolution
MAC medium access control
MM/MME mobility management/mobility management entity
Node B base station
O&M operations and maintenance
PDCP packet data convergence protocol
PHY physical
RLC radio link control
RRC radio resource control
RRM radio resource management
S GW serving gateway
UE user equipment
UTRAN universal terrestrial radio access network

SUMMARY

Various aspects of examples of the invention are set out in the claims.

According to a one aspect of the present invention, a method is disclosed. The method includes defining a first privacy setting related to a user. Communicating the first privacy setting using a first radio communication network to a server. Storing the first privacy setting related to the user on the server. Applying the first privacy setting when analyzing an image to determine the user in the image. Determining to apply a second privacy setting related to the user. Defining the second privacy setting related to the user and communicating the second privacy setting to another device of a second user using a second radio communication network.

According to another aspect of the present invention, a method is disclosed. The method includes analyzing an image to determine a person in the image. Determining a relationship status of the person. Superseding (or overriding) a privacy status of the person based, at least partially, on the relationship status of the person or an authorization by the person.

According to another aspect of the present invention, a computer program product including a computer-readable medium bearing computer program code embodied therein for use with a computer is disclosed. The computer program code includes code for defining a first privacy setting related to a user. Code for communicating the first privacy setting using a first radio communication network to a server. Code for storing the first privacy setting related to the user on the server. Code for applying the first privacy setting when analyzing an image to determine the user in the image. Code for determining to apply a second privacy setting related to the user. Code for defining the second privacy setting related to the user and communicating the second privacy setting to another device of a second user using a second radio communication network.

BRIEF DESCRIPTION OF THE DRAWINGS

For a more complete understanding of example embodiments of the present invention, reference is now made to the following descriptions taken in connection with the accompanying drawings in which:

FIG. 7 is a block diagram in accordance with the exemplary embodiments of this invention;

FIG. 8 is a block diagram in accordance with the exemplary embodiments of this invention;

DETAILED DESCRIPTION OF THE DRAWINGS

An example embodiment of the present invention and its potential advantages are understood by referring to FIGS. 1 through 11 of the drawings.

Figure 1:
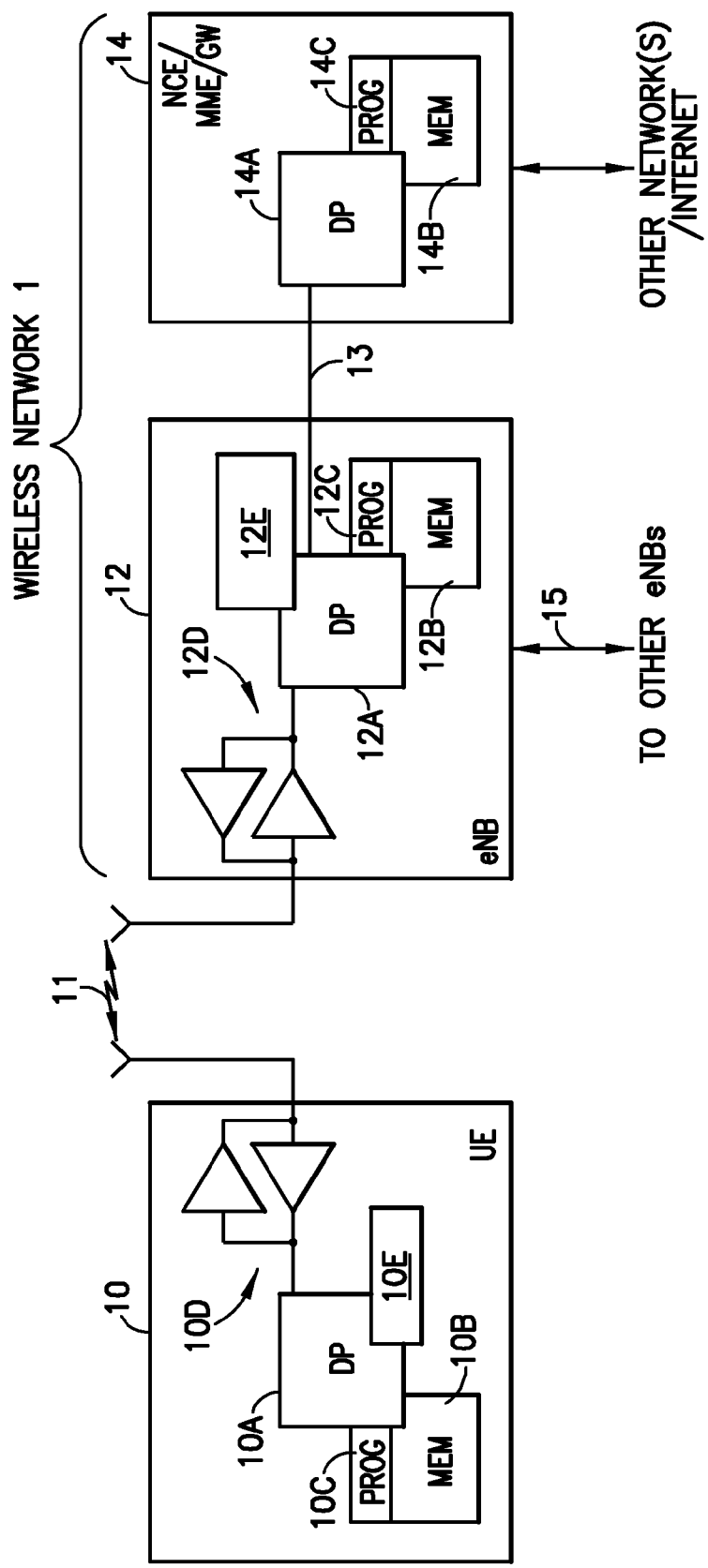
FIG. 1 a simplified block diagram of various electronic devices that are suitable for use in practicing the exemplary embodiments of this invention.
Figure 3:
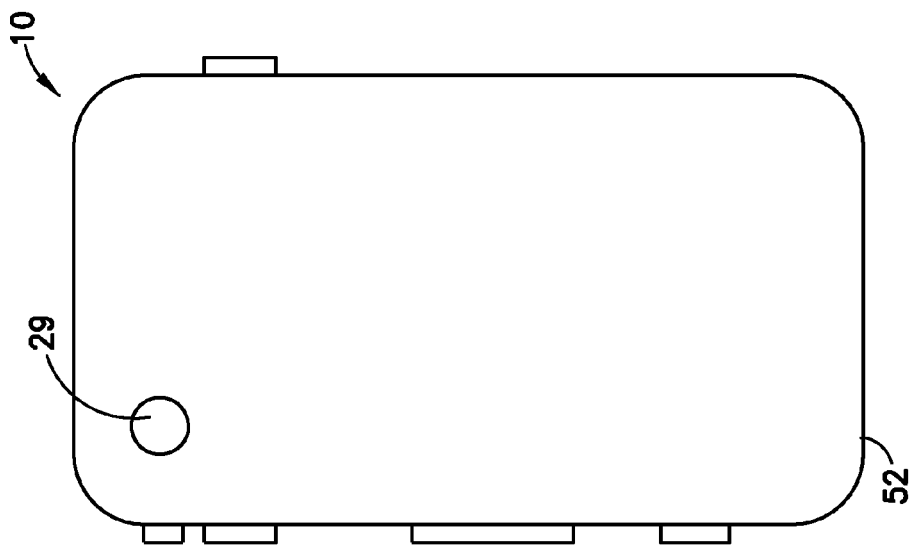
FIG. 3 is a rear view of the electronic device shown in FIG. 1.

Referring to FIG. 1, there is shown a simplified block diagram of various electronic devices and apparatus that are suitable for use in practicing the exemplary embodiments of this invention. Although embodiments of the invention will be described with reference to the exemplary embodiments shown in the drawings, it should be understood that the embodiments of the invention can be embodied in many alternate forms of embodiments. In addition, any suitable size, shape or type of elements or materials could be used.

In FIG. 1 a wireless network 1 is adapted for communication over a wireless link 11 with an apparatus, such as a mobile communication device which may be referred to as a user equipment (UE) 10, via a network access node, such as a Node B (base station), and more specifically an eNB 12. The eNB 12 may be, for example, part of the overall architecture of a E-UTRAN system. The EUTRAN system generally includes eNBs, providing the E-UTRA user plane (PDCP/RLC/MAC/PHY) and control plane (RRC) protocol terminations towards the UE. The eNBs may be interconnected with each other by means of an X2 interface. The eNBs are also generally connected by means of an S1 interface to an EPC, more specifically to a MME (Mobility Management Entity) by means of a S1 MME interface and to a Serving Gateway (SGW) by means of a S1 interface. The S1 interface supports a many to many relationship between MMEs/Serving Gateways and eNBs.

The eNB generally hosts the following functions: functions for Radio Resource Management: Radio Bearer Control, Radio Admission Control, Connection Mobility Control, Dynamic allocation of resources to UEs in both uplink and downlink (scheduling); IP header compression and encryption of the user data stream; selection of a MME at UE attachment; routing of User Plane data towards the Serving Gateway; scheduling and transmission of paging messages (originated from the MME); scheduling and transmission of broadcast information (originated from the MME or O&M); and a measurement and measurement reporting configuration for mobility and scheduling.

The network 1 may include a network control element (NCE) 14 that may include the MME/S GW functionality, and which provides connectivity with a network 1, such as a telephone network and/or a data communications network (e.g., the internet). The UE 10 includes electronic circuitry such as a controller, such as a computer or a data processor (DP) 10A, a computer-readable memory medium embodied as a memory (MEM) 10B that stores a program of computer instructions (PROG) 10C, and a suitable radio frequency (RF) transceiver 10D for bidirectional wireless communications with the eNB 12 via one or more antennas. The eNB 12 also includes a controller, such as a computer or a data processor (DP) 12A, a computer-readable memory medium embodied as a memory (MEM) 12B that stores a program of computer instructions (PROG) 12C, and a suitable RF transceiver 12D for communication with the UE 10 via one or more antennas. The eNB 12 is coupled via a data/control path 13 to the NCE 14. The path 13 may be implemented as the S1 interface. The eNB 12 may also be coupled to another eNB via data/control path 15, which may be implemented as the X2 interface. While the UE 10 and eNB 12 have been described above in connection with a transceiver, one skilled in the art will appreciate that embodiments of the invention are not necessarily so limited and that various embodiments may comprise a separate receiver and transmitter instead of a transceiver.

At least one of the PROGs 10C and 12C is assumed to include program instructions that, when executed by the associated DP, enable the device to operate in accordance with the exemplary embodiments of this invention, as will be discussed below in greater detail.

That is, the exemplary embodiments of this invention may be implemented at least in part by computer software executable by the DP 10A of the UE 10 and/or by the DP 12A of the eNB 12, or by hardware, or by a combination of software and hardware (and firmware).

For the purposes of describing the exemplary embodiments of this invention the UE 10 may be assumed to also include a Privacy Protection System (PPS) 10E, and the eNB 12 may include a Privacy Protection System (PPS) 12E.

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer readable MEMs 10B and 12B may be of any type suitable to the local technical environment and may be implemented using any suitable data storage technology, such as semiconductor based memory devices, flash memory, magnetic memory devices and systems, optical memory devices and systems, fixed memory and removable memory. The DPs 10A and 12A may be of any type suitable to the local technical environment, and may include one or more of general purpose computers, special purpose computers, microprocessors, digital signal processors (DSPs) and processors based on a multicore processor architecture, as non-limiting examples.

Figure 2:
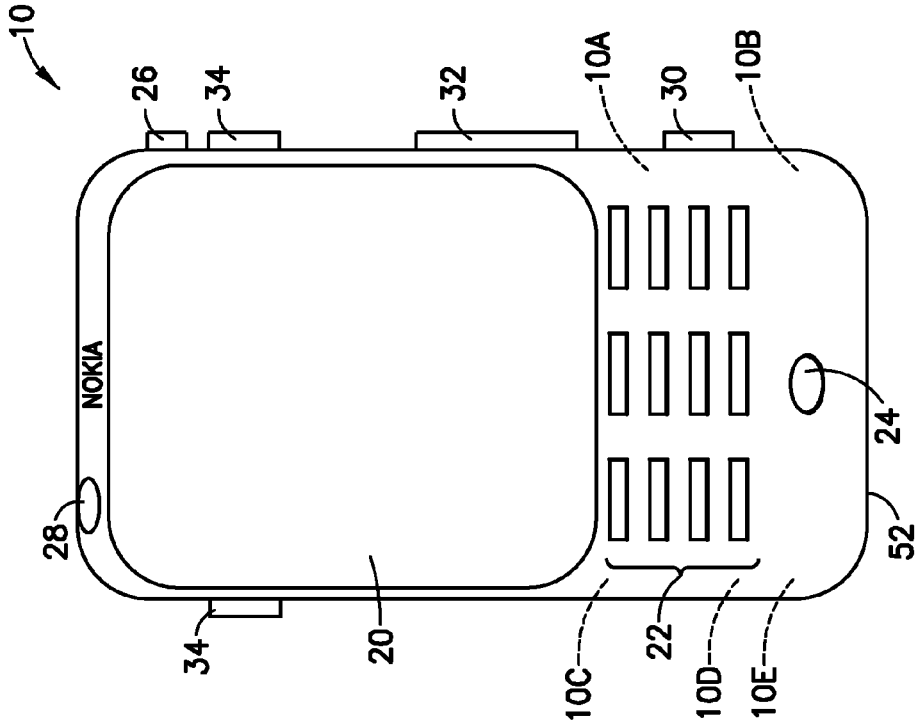
FIG. 2 is a front view of the electronic device shown in FIG. 1.

Referring to FIG. 2, there is shown a front view of the electronic device (or user equipment [UE]) 10. The device 10 generally comprises a housing 52, a graphical display interface 20, and a user interface 22 illustrated as a keypad but understood as also encompassing touch-screen technology at the graphical display interface 20 and voice-recognition technology received at the microphone 24. A power actuator 26 controls the device being turned on and off by the user. The exemplary UE 10 may have a forward facing camera 28 (for example for video calls) and/or a rearward facing camera 29 (for example for capturing images and video for local storage, see FIG. 3). The cameras 28, 29 are controlled by a shutter actuator 30 and optionally by a zoom actuator 32 which may alternatively function as a volume adjustment for the speaker(s) 34 when the cameras 28, 29 are not in an active mode.

While various exemplary embodiments of the invention have been described above in connection with the graphical display interface 20 and the user interface 22, one skilled in the art will appreciate that exemplary embodiments of the invention are not necessarily so limited and that some embodiments may comprise only the display interface 20 (without the user interface 22) wherein the display 20 forms a touch screen user input section.

Figure 4:
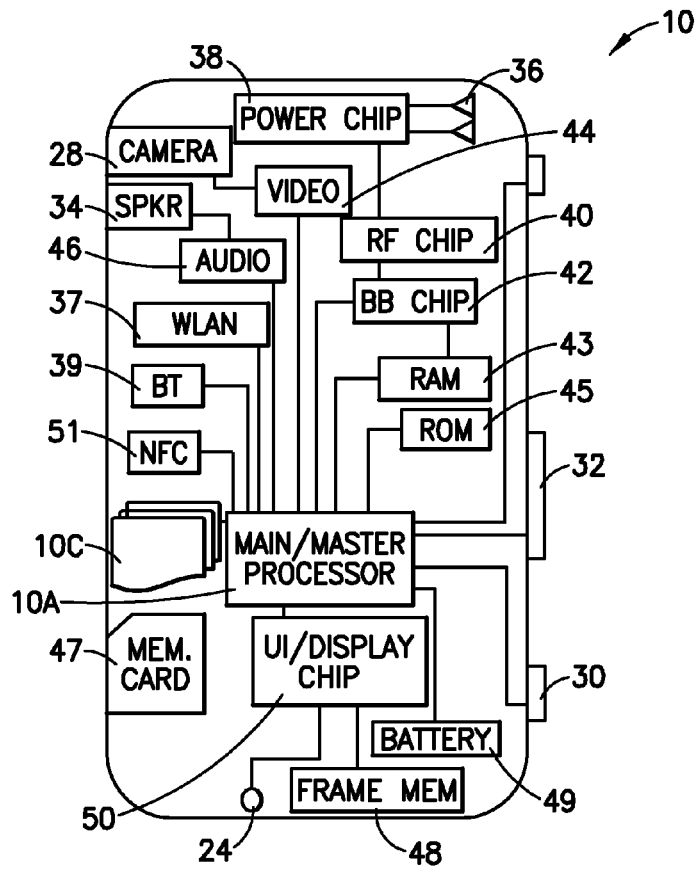
FIG. 4 is a more particularized block diagram of the electronic device shown in FIG. 1.

Referring now also to the sectional view of FIG. 4, there are seen multiple transmit/receive antennas 36 that are typically used for cellular communication. The antennas 36 may be multi-band for use with other radios in the UE. The operable ground plane for the antennas 36 is shown by shading as spanning the entire space enclosed by the UE housing though in some embodiments the ground plane may be limited to a smaller area, such as disposed on a printed wiring board on which the power chip 38 is formed. The power chip 38 controls power amplification on the channels being transmitted and/or across the antennas that transmit simultaneously where spatial diversity is used, and amplifies the received signals. The power chip 38 outputs the amplified received signal to the radio-frequency (RF) chip 40 which demodulates and downconverts the signal for baseband processing. The baseband (BB) chip 42 detects the signal which is then converted to a bit-stream and finally decoded. Similar processing occurs in reverse for signals generated in the apparatus 10 and transmitted from it.

Signals to and from the cameras 28, 29 pass through an image/video processor 44 which encodes and decodes the various image frames. A separate audio processor 46 may also be present controlling signals to and from the speakers 34 and the microphone 24. The graphical display interface 20 is refreshed from a frame memory 48 as controlled by a user interface chip 50 which may process signals to and from the display interface 20 and/or additionally process user inputs from the keypad 22 and elsewhere.

Certain embodiments of the UE 10 may also include one or more secondary radios such as a wireless local area network radio WLAN 37 and a Bluetooth® radio 39, which may incorporate an antenna on-chip or be coupled to an off-chip antenna. Certain embodiments may also include a near field communications (NFC) chip 51 configured for connecting with another device. Throughout the apparatus are various memories such as random access memory RAM 43, read only memory ROM 45, and in some embodiments removable memory such as the illustrated memory card 47. The various programs 10C are stored in one or more of these memories. All of these components within the UE 10 are normally powered by a portable power supply such as a battery 49.

The aforesaid processors 38, 40, 42, 44, 46, 50, if embodied as separate entities in a UE 10 or eNB 12, may operate in a slave relationship to the main processor 10A, 12A, which may then be in a master relationship to them. It should be noted that various exemplary embodiments of the invention may be disposed across various chips and memories as shown or disposed within another processor that combines some of the functions described above for FIG. 4. Any or all of these various processors of FIG. 4 access one or more of the various memories, which may be on-chip with the processor or separate therefrom. Similar function-specific components that are directed toward communications over a network broader than a piconet (e.g., components 36, 38, 40, 42-45 and 47) may also be disposed in exemplary embodiments of the access node 12, which may have an array of tower-mounted antennas rather than the two shown at FIG. 4.

Note that the various chips (e.g., 38, 40, 42, etc.) that were described above may be combined into a fewer number than described and, in a most compact case, may all be embodied physically within a single chip.

Figure 5:
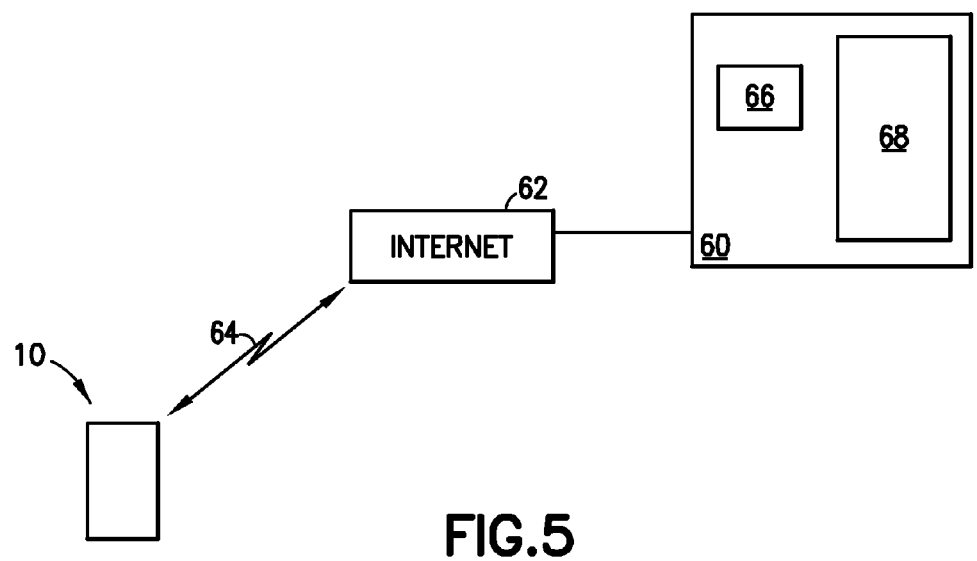
FIG. 5 is a block diagram of the electronic device and a privacy server.

Referring now also to FIG. 5 there is shown a privacy server 60. The privacy server 60 is configured to be connected to the device 10 via a network 62, such as the internet. The connection between the network 62 and the device 10 may be provided through a link 64. According to some embodiments of the invention, the link may include a wireless link, such as the wireless link 11. According to some embodiments of the invention, the link may include a wireless link configured to be connected to a wireless data network, such as a Wi-Fi network, for example. According to some embodiments of the invention, the link may include a wired link, such as through a direct cable connection, configured to be connected to the internet. The server 60 includes a processor 66 and a memory 68 similar to the processor 10A and the memory 10B. The privacy server may further include any suitable type of features as known in the art.

Based on the foregoing it should be apparent that the exemplary embodiments of this invention provide a method, apparatus and computer program(s) to provide a privacy protection system that can provide settings for a social network and also use face recognition technology to identify faces in images uploaded on to the social network.

According to various exemplary embodiments of the invention, the privacy protection system provides for the privacy protection of an individual, wherein, for example, a person's willingness to be photographed is checked or verified before data is uploaded to a social network.

Figure 6:
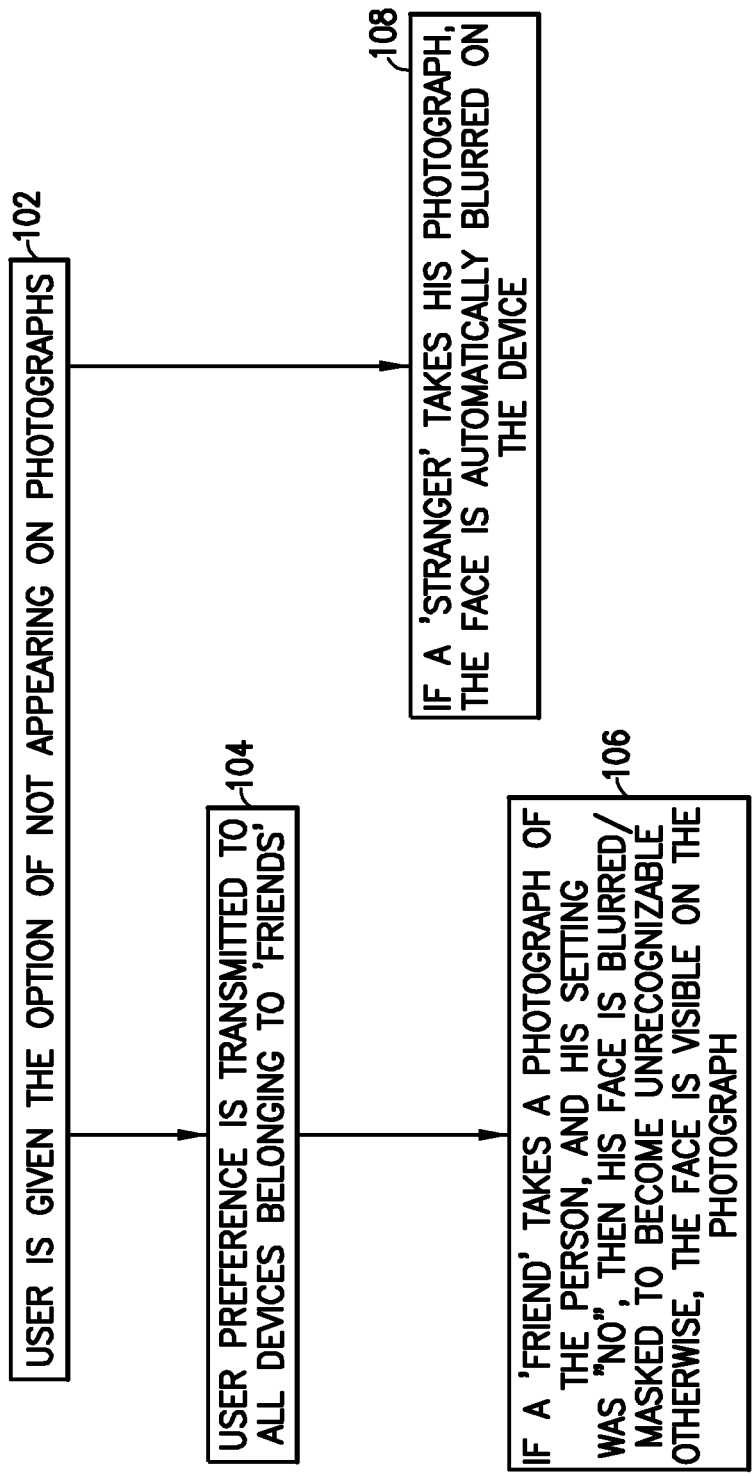
FIG. 6 is block diagram in accordance with the exemplary embodiments of this invention.

The privacy protection system allows for a user of a social network to provide privacy protection in images by giving the user an option of not appearing on photographs. Referring now also to FIG. 6, the privacy protection system provides the user with an option of not appearing on photographs (at block 102). The options given to the user may be, for example: a) Appear on Friend's Photographs Yes/No; b) Appear on Stranger's Photographs Yes/No. The option provides for the user to select a privacy status that will be reflected in the social network. For example, a 'friend' may be a person on the user's list of known persons, and a 'stranger' may be a person that is not on the list of the user's known persons. However, it should be noted that according to various exemplary embodiments, the privacy status may be provided for other lists of people on the social network, such as a 'work friends' list, or a 'family friends' list, for example. In the above example, a default could be set in the privacy protection system that the 'Appear on Friend's Photographs' privacy status could be set to 'Yes', and the 'Appear on Stranger's Photographs' privacy status could be set to 'No'. However, in alternate embodiments, any default settings may be provided. With the privacy status set, the user may or may not appear in a friend's/stranger's photograph according to the chosen option (Yes/No).

At block 104, the user preference of the privacy status is transmitted to all devices belonging to 'friends' of the user. According to some embodiments of the invention, the privacy protection system transmits the user preference from the user's device to the friends' devices.

In some other embodiments of the invention, the privacy protection system transmits the user preference from the user's device to the social network, and the 'friends' devices are updated with the corresponding user preference when a connection to the social network is established.

At block 106, if a 'friend' of the user takes a photograph of the user, and the user setting in a) was 'No', then the user's face in the image is blurred or masked (or obscured) to become unrecognizable. The 'blurring' may be provided locally on the 'friends' device when the picture is taken, for example when the privacy protection system transmits the user preference from the user's device to the friends devices. Or the 'blurring' may be provided when the 'friend' uploads the picture or image to the social network, as the user preference of the privacy status is available on the social network. Otherwise, if the 'friend' of the user takes a photograph of the user, and the user setting in a) was 'Yes', then the face would be visible on the photograph.

At block 108, if a 'stranger' takes the user's photograph, then the face is automatically blurred on the device. According to some embodiments of the invention, the automatic blurring may be provided, for example when the user gives permission to the 'stranger' for taking his photograph. According to some embodiments of the invention, this permission could be done by a 'NFC shake'. Where the user can give permission for taking his/her photograph to a stranger for a specified time period using a short-mid range radio communication, such as near field communication (NFC) tags, for example, for transmitting face vectors of the user. For example, devices are brought close together, and the 'stranger's' device is updated with face vectors of the user. This will give the 'stranger' the opportunity to take photographs of the user for a specified time. According to some embodiments, the time could be specified by the user in the privacy status setting. Alternatively, the 'permission' could be provided through social networking site. For example, if the user searches for the 'stranger's' profile, and allows the stranger to take photographs/images of the user, where face vectors are transmitted with the specified time.

According to various exemplary embodiments of the invention, the privacy server 60 stores a list of the friends or contacts for the user of the device 10. The privacy server 60 may further include the privacy status/setting of images for each of the friends or contacts on the list. Furthermore, the privacy server 60 may further comprise the face vectors (or face feature vectors) for each of the friends or contacts on the list. The privacy protection system is configured to communicate with the privacy server in order to provide a synchronization of the friends/contact list, the privacy setting, and/or the face vectors between the device 10 and the server 60. For example, when one of the friends/contacts on the list changes the privacy setting, the change is reflected on the privacy server 60 and then updated on the device 10 after a synchronization is performed. Alternatively, if a face is recognized in an image, then the device 10 can communicate with the server 60 to verify the privacy status of the person. Additionally, if the user of the device 10 adds a contact on the device 10, then this is updated on the server 60 when a synchronization is performed and the server 60 further sends the privacy setting and/or the face feature vector to the device 10.

Additionally, it should be noted that the face recognition can also be performed with embodiments where the device 10 is a personal computer or a laptop computer where, for example, software (such as Zune software) can be used to recognize the face of the person in the image. Once the face is recognized the privacy status of the person is verified on with the profile information on the device. Additionally, the privacy server 60 is configured to perform similar functionality wherein the face recognition is performed on the privacy server 60 and then the device is updated when a synchronization is performed.

According to various exemplary embodiments of the invention, the connection and synchronization between the privacy protection system and the privacy server allow for superseding (or overriding), temporarily or for a certain duration, the privacy setting so that the user of the device may take an image of the person that will not be modified (such as by blurring, for example).

While various embodiments have been described above in connection with 'face vectors', one skilled in the art will appreciate that the various embodiments are not necessarily so limited and that any other suitable face recognition method may be provided.

According to some other embodiments of the invention, when the 'stranger' takes the user's photograph and uploads the user's image to the social network, then the face of the user is automatically blurred as the privacy protection system has provided the user's privacy status user setting and/or the face vector (or other face recognition method/technology) to the social network to that any images uploaded by strangers are analyzed for the user's face, and once the user's face is recognized, the portion of the image which includes the face of the user is 'blurred'. Additionally, even if a 'friend' of the user takes a photograph of the user and uploads the image to the social network, then the face of the user is blurred/visible based on selected option.

Further, if the user's photograph is taken in a crowd (such as if the user is at a rally, or the theatre, for example) the face of the user is automatically blurred even when clicked by a friend.

It should also be noted that it is possible that the user also agrees to be photographed by the 'stranger', and then with the corresponding settings in the privacy status, the face of the user in the image taken by the 'stranger' would be visible.

FIG. 7 illustrates a method 200. The method 200 includes capturing an image with a camera of a device (at block 202). Analyzing the image to determine a person in the image (at block 204). Determining a privacy status of the person (at block 206). Modifying a portion of the image based, at least partially, on the determined privacy status of the person (at block 208). It should be noted that the illustration of a particular order of the blocks does not necessarily imply that there is a required or preferred order for the blocks and the order and arrangement of the blocks may be varied. Furthermore it may be possible for some blocks to be omitted.

FIG. 8 illustrates a method 300. The method 300 includes capturing an image with a camera of a device (at block 302). Analyzing the image to determine a person in the image (at block 304). Determining a relationship status of the person (at block 306). Modifying a portion of the image based, at least partially, on the determined relationship status of the person (at block 308). It should be noted that the illustration of a particular order of the blocks does not necessarily imply that there is a required or preferred order for the blocks and the order and arrangement of the blocks may be varied. Furthermore it may be possible for some blocks to be omitted.

Figure 9:
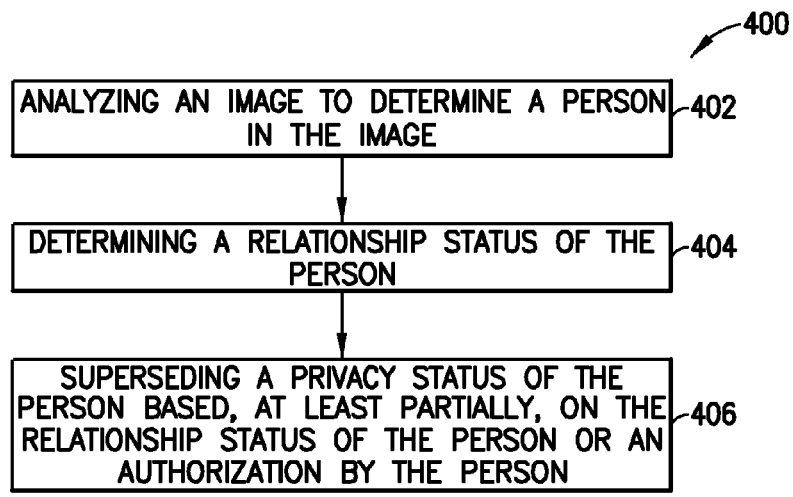
FIG. 9 is a block diagram in accordance with the exemplary embodiments of this invention.

FIG. 9 illustrates a method 400. The method 400 includes analyzing an image to determine a person in the image (at block 402). Determining a relationship status of the person (at block 404). Superseding a privacy status of the person based, at least partially, on the relationship status of the person or an authorization by the person (at block 406). It should be noted that the illustration of a particular order of the blocks does not necessarily imply that there is a required or preferred order for the blocks and the order and arrangement of the blocks may be varied. Furthermore it may be possible for some blocks to be omitted.

According to various exemplary embodiments of the invention, when the user of the device captures an image, the privacy protection system is configured to analyze the image to determine a person in the image (such as by face recognition technology, for example). The privacy protection system is configured to determine a relationship status of the person. The relationship status may be 'friend', 'family', or 'acquaintance', for recognized persons. The relationship status may be 'stranger', 'unknown', or 'not known', for persons not recognized. In the event that the person in the image is not recognized (and considered a stranger, or unknown, for example), the person's face is automatically blurred. In some embodiments of the invention, the person in the image is not recognized after the image is analyzed due to the person not being present in the contact list of the user (wherein, for example, the user's contact list includes information to compare with the image, such as an image of the person, face vectors corresponding to the person, any suitable facial recognition data, or any other suitable recognition data). In some other embodiments of the invention, the person in the image is not recognized after the image is analyzed due to the person not being on a friend list in a social networking site (wherein, for example, the person's profile in the social networking web site includes information to compare with the image, such as an image of the person, face vectors corresponding to the person, any suitable facial recognition data, or any other suitable recognition data). In the event that the person in the image is recognized (and considered a friend, or known person, or a family member, for example), and the person's privacy setting/status is set to 'privacy' or 'privacy on' for example, then the person's face would be automatically blurred. In the event that the person in the image is recognized (and considered a friend, or known person, or a family member, for example), and the person's privacy setting/status is set to 'public' or 'privacy off' for example, then the person's face would be shown in the image.

Figure 10:
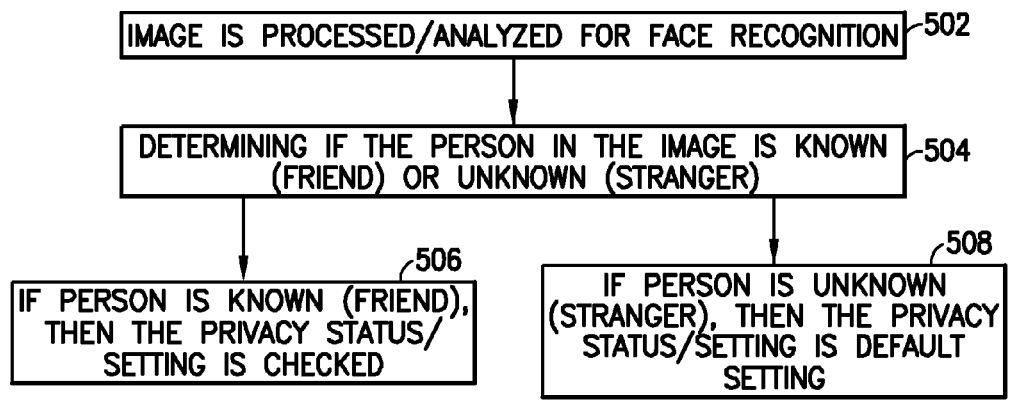
FIG. 10 is a block diagram in accordance with the exemplary embodiments of this invention.

Referring now also to FIG. 10, the relationship status and privacy status/setting may be checked by the privacy protection system of the device or the privacy server (or a combination of both the privacy protection system and the privacy server) wherein the image is processed/analyzed for face recognition, such as by using face feature vectors, for example (at block 502). After the face recognition is performed, the privacy protection system and/or the privacy server compare the results with the users contacts/friends list, to determine if the person in the image is known or unknown (at block 504). If the person is known, then the privacy status/setting in the person's profile of the contacts/friends list can be checked or verified for a selection of 'privacy on' or 'privacy off' (at block 506). If the person is unknown, then the privacy status/setting may be a default setting (such as 'privacy on', for example) (at block 508). In some embodiments of the invention, if the unknown person is not on the user's friends list, but is a member of a social network common to the user, then there may be an additional option set by the person for the privacy status/setting.

According to various exemplary embodiments of the invention, the privacy setting/status could be superseded for some time, through NFC, or through an outlook calendar event/invitation function (or any other suitable calendar function, for example). For example, if a person sends an electronic birthday invitation to be stored in a calendar application to invite friends to a party, the outlook calendar event/invitation sent by the user may have a privacy setting (or the calendar application may have a privacy setting/status for all invitations) which enables the user of the device to take pictures of all the persons invited in the calendar event/invitation (wherein the setting in the calendar event/invitation overrides any other privacy setting). Additionally, in some embodiments of the invention, the person receiving the calendar is provided an option to accept the calendar with/without the privacy setting. This can, for example, ensure that people in the invited group can take pictures of each other.

Figure 11:
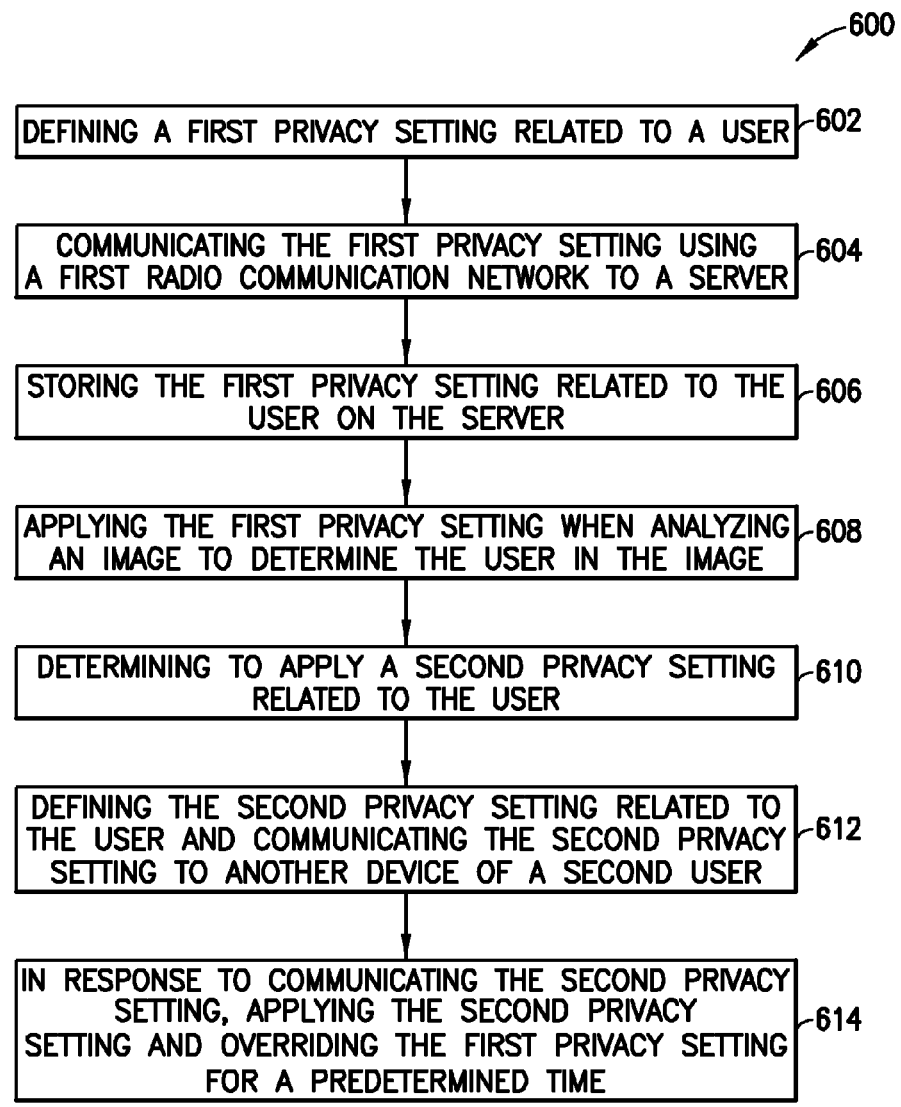
FIG. 11 is a block diagram in accordance with the exemplary embodiments of this invention.

FIG. 11 illustrates a method 600. The method 600 includes defining a first privacy setting related to a user (at block 602). Communicating the first privacy setting using a first radio communication network to a server, such as an LTE network, for example (at block 604). Storing the first privacy setting related to the user on the server (at block 606). Applying the first privacy setting when analyzing an image to determine the user in the image (at block 608). Determining to apply a second privacy setting related to the user (at block 610). Defining the second privacy setting related to the user and communicating (or sending) the second privacy setting to another device of a second user using a second radio communication network, such as an NFC or Bluetooth network, for example (at block 612). In response to sending (or communicating) the second privacy setting to the another device of the second user, applying the second privacy setting and overriding the first privacy setting for a predetermined time (at block 614). It should be noted that the illustration of a particular order of the blocks does not necessarily imply that there is a required or preferred order for the blocks and the order and arrangement of the blocks may be varied. Furthermore it may be possible for some blocks to be omitted.

According to various exemplary embodiments of the invention, the privacy protection feature provides for use cases where two 'strangers' meet and want to take a photo without blurring (or otherwise modifying) each other's faces in the image. Various exemplary embodiments of the invention also provide for use cases where the permanent settings in the privacy server indicate "familiarity", but the users just want to blur (or otherwise modify) faces for a predetermined time. For example, if friends are together in a social setting and a 'party' atmosphere ensues where for example the user may not want to be identified in a picture(s), as the picture(s) may not portray the user in a professional manner, then the user may choose to blur or modify the image(s) taken during the social event so that he/she may not be identified.

According to various exemplary embodiments of the invention, the privacy setting(s) in the privacy server are not changed. For example, if the setting(s) is superseded or overridden by the short-mid range radio communication (such as NFC or Bluetooth, for example), then this just "disables" the function of the server privacy policy for a predetermined time. This provides for two systems for defining the privacy settings wherein the privacy server defines the privacy settings (which can be changed we the user changes his/her profile, however profile changes are generally used for long term [or non-temporary] settings), where these settings are valid all the time, excluding those times when the user decides to disable the settings using NFC or Bluetooth communications to override the settings for some predetermined short time.

Without in any way limiting the scope, interpretation, or application of the claims appearing below, a technical effect of one or more of the example embodiments disclosed herein is providing privacy protection in images by giving users an option of not appearing on photographs. Another technical effect of one or more of the example embodiments disclosed herein is that a user may or may not appear in a friend's/stranger's photograph according to the chosen option. Another technical effect of one or more of the example embodiments disclosed herein is that the user's face will not be visible or will be blurred/masked when the chosen option is 'NO'. Another technical effect of one or more of the example embodiments disclosed herein is if a stranger tries to upload a photograph of the user, probably taken from another device, the user's face is blurred. Another technical effect of one or more of the example embodiments disclosed herein is that a user can, just before going to a rally, change his settings. This ensures that the user becomes 'invisible' or unrecognizable in any photographs taken in the crowd. So, even if the user's 'friend' is taking a photograph, the user will not be visible (or recognizable) in it, as the user's face will be blurred.

Another technical effect of one or more of the example embodiments disclosed herein is that the user's privacy is protected with the privacy protection system, as the user will not appear in any image where he does not intend to. Even though, in some embodiments, the image processing may become a little cumbersome to take photos, for example to provide the suitable type of blurring as to not spoil the photographs, the added benefit of privacy protection provides significant advantages. Another technical effect of one or more of the example embodiments disclosed herein is that the privacy of a person (such as the user) is respected and his photographs are not published on the web accidently. Another technical effect of one or more of the example embodiments disclosed herein is when two strangers meet and want to take a photo of each other, superseding the privacy setting stored on the server temporarily for a predetermined is possible using NFC.

Another technical effect of one or more of the example embodiments disclosed herein is that users can avoid being 'tricked' into posting images onto the social networks as, it is very easy to download images being shared publicly on the network, and the images can be morphed easily. Another technical effect of one or more of the example embodiments disclosed herein is that a user can feel safe that his/her identity is not known when images are taken at rally, and posted on the social network. Another technical effect of one or more of the example embodiments disclosed herein is that a user can avoid being captured in an image where he/she 'accidently' appears in them, such as when the user is passing through a street where these images could be uploaded onto social media/internet (and user privacy could be compromised [accidently], and he/she may not have wanted to disclose his location in any way).

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as nonlimiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the EUTRAN (UTRAN-LTE) system, it should be appreciated that the exemplary embodiments of this invention are not limited for use with only this one particular type of wireless communication system, and that they may be used to advantage in other wireless communication systems such as for example (WLAN, UTRAN, GSM as appropriate).

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

As used in this application, the term 'circuitry' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Below are provided further descriptions of various non-limiting, exemplary embodiments. The below-described exemplary embodiments may be practiced in conjunction with one or more other aspects or exemplary embodiments. That is, the exemplary embodiments of the invention, such as those described immediately below, may be implemented, practiced or utilized in any combination (e.g., any combination that is suitable, practicable and/or feasible) and are not limited only to those combinations described herein and/or included in the appended claims.

In one exemplary embodiment, a method comprising capturing an image with a camera of a device; analyzing the image to determine a person in the image; determining a privacy status of the person; and modifying a portion of the image based, at least partially, on the determined privacy status of the person.

In another exemplary embodiment, a method comprising capturing an image with a camera of a device; analyzing the image to determine a person in the image; determining a relationship status of the person; and modifying a portion of the image based, at least partially, on the determined relationship status of the person.

The method as above wherein the determining the relationship status of the person comprises determining if the person is a known person or an unknown person.

The method as above wherein the determining comprises determining a privacy status of the person, and wherein the modifying comprises modifying the portion of the image based, at least partially, on the determined privacy status of the person.

The method as above, wherein the analyzing further comprises analyzing the image to determine a face of the person in the image.

The method as above, wherein the modifying further comprises blurring a portion of the image.

The method as above, wherein the person is not recognizable in the image after the portion of the image is modified.

The method as above, comprising determining if the person is a known person or an unknown person in a social network.

The method as above, wherein the privacy status is set by the person.

An apparatus configured to perform the method as above.

A method substantially as herein described and illustrated in the accompanying drawings.

An apparatus substantially as herein described and illustrated in the accompanying drawings.

A computer program product comprising program instructions to perform the method as above.

In another exemplary embodiment, an apparatus, comprising: a camera; at least one processor; and at least one memory including computer program code, the at least one memory and the computer program code configured to, with the at least one processor, cause the apparatus to perform at least the following: analyze an image captured by the camera; determine a person in the image; determine a privacy status of the person; and modify a portion of the image based, at least partially, on the determined privacy status of the person. In another exemplary embodiment, a computer program product comprising a computer-readable medium bearing computer program code embodied therein for use with a computer, the computer program code comprising: code for analyzing an image captured by a camera; code for determining a person in the image; code for determining a privacy status of the person; and code for modifying a portion of the image based, at least partially, on the determined privacy status of the person.

In another exemplary embodiment, a method comprising: analyzing an image to determine a person in the image; determining a relationship status of the person; and superseding a privacy status of the person based, at least partially, on the relationship status of the person or an authorization by the person.

The method as above wherein the determining the relationship status of the person comprises determining if the person is a known person or an unknown person.

The method as above wherein the privacy status comprises a setting set by the person when person is a known person.

The method as above wherein the privacy status comprises a default setting when the person is an unknown person.

The method as above wherein the superseding comprises superseding the privacy status for a predetermined amount of time, wherein after the predetermined amount of time a portion of the image is blurred.

The method as above wherein the authorization by the person is provided by a short-mid range radio communication.

An apparatus configured to perform the method above.

The method as above substantially and as herein described and illustrated in the accompanying drawings.

An apparatus substantially as herein described and illustrated in the accompanying drawings.

A computer program product comprising program instructions to perform the method above.

In another exemplary embodiment, a method comprising: defining a first privacy setting related to a user; communicating the first privacy setting using a first radio communication network to a server; storing the first privacy setting related to the user on the server; applying the first privacy setting when analyzing an image to determine the user in the image; determining to apply a second privacy setting related to the user; and defining the second privacy setting related to the user and communicating (or sending) the second privacy setting to another device of a second user using a second radio communication network.

The method as above wherein in response to sending (or communicating) the second privacy setting to the another device of the second user, applying the second privacy setting and overriding the first privacy setting for a predetermined time.

The method as above wherein after the predetermined time a portion of the image is blurred. The method as above wherein the first radio communication network comprises a long term evolution (LTE) network.

The method as above wherein the second radio communication network comprises a near field communications (NFC) network.

The method as above wherein the second radio communication network comprises a Bluetooth network.

An apparatus configured to perform the method above.

The method as above substantially and as herein described and illustrated in the accompanying drawings.

An apparatus substantially as herein described and illustrated in the accompanying drawings. A computer program product comprising program instructions to perform the method above. If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It should be understood that the foregoing description is only illustrative of the invention. Various alternatives and modifications can be devised by those skilled in the art without departing from the invention. Accordingly, the invention is intended to embrace all such alternatives, modifications and variances which fall within the scope of the appended claims.

I claim:

1. A method comprising:
defining a first privacy setting related to a user, wherein the first privacy setting is determined by the user;
communicating the first privacy setting using a first radio communication network to a server;
storing the first privacy setting related to the user on the server;
applying the first privacy setting when analyzing an image to determine the user in the image;
determining to apply a second privacy setting related to the user, wherein the second privacy setting is determined by the user; and
defining the second privacy setting related to the user and communicating the second privacy setting to another device of a second user using a second radio communication network, wherein the second privacy setting determines how the image or another image of the user is accessible from the another device of the second user while overriding the first privacy setting for a period of time.

2. A method as claimed in claim 1 wherein in response to communicating the second privacy setting to the another device of the second user, applying the second privacy setting and overriding the first privacy setting for a predetermined time.

3. A method as claimed in claim 2 wherein after the predetermined time a portion of the image is blurred.

4. A method as claimed in claim 1 wherein the first radio communication network comprises a long term evolution (LTE) network.

5. A method as claimed in claim 1 wherein the second radio communication network comprises a near field communications (NFC) network.

6. A method as claimed in claim 1 wherein the second radio communication network comprises a Bluetooth network.

7. An apparatus comprising: at least one processor; and at least one memory including computer program code for one or more programs, the at least one memory and the computer program code configured to, with the at least one processor, cause the apparatus to perform at least the following,
define a first privacy setting related to a user;
communicate the first privacy setting using a first radio communication network to a server;
store the first privacy setting related to the user on the server;
apply the first privacy setting when analyzing an image to determine the user in the image;
determine to apply a second privacy setting related to the user; and
define the second privacy setting related to the user and communicating the second privacy setting to another device of a second user using a second radio communication network,
wherein the second privacy setting determines how the image or another image of the user is accessible from the another device of the second user while overriding the first privacy setting for a period of time.

8. An apparatus as claimed in claim 7 wherein in response to communicate the second privacy setting to the another device of the second user, the apparatus is further caused to apply the second privacy setting and to override the first privacy setting for a predetermined time.

9. An apparatus as claimed in claim 8 wherein after the predetermined time a portion of the image is blurred.

10. An apparatus as claimed in claim 7 wherein the first radio communication network comprises a long term evolution (LTE) network.

11. An apparatus as claimed in claim 7 wherein the second radio communication network comprises a near field communications (NFC) network.

12. An apparatus as claimed in claim 7 wherein the second radio communication network comprises a Bluetooth network.

13. A computer program product comprising a non-transitory computer readable storage medium having computer-readable code embodied thereon, the computer-readable code executable by an apparatus and causing the apparatus, in response to the execution of the computer-readable code, causing the apparatus to perform at least the following:
define a first privacy setting related to a user;
communicate the first privacy setting using a first radio communication network to a server;
store the first privacy setting related to the user on the server;
apply the first privacy setting when analyzing an image to determine the user in the image;
determine to apply a second privacy setting related to the user; and
define the second privacy setting related to the user and communicating the second privacy setting to another device of a second user using a second radio communication network, wherein the second privacy setting determines how the image or another image of the user is accessible from the another device of the second user while overriding the first privacy setting for a period of time.

14. A computer program product as claimed in claim 13 wherein in response to communicate the second privacy setting to the another device of the second user, the program instructions further apply the second privacy setting and override the first privacy setting for a predetermined time.

15. A computer program product as claimed in claim 14 wherein after the predetermined time a portion of the image is blurred.

16. A computer program product as claimed in claim 13 wherein the first radio communication network comprises a long term evolution (LTE) network.

17. A computer program product as claimed in claim 13 wherein the second radio communication network comprises a near field communications (NFC) network.

18. A computer program product as claimed in claim 13 wherein the second radio communication network comprises a Bluetooth network.

* * * * *